United States Patent [19]

Reid et al.

[11] Patent Number: 5,420,987
[45] Date of Patent: May 30, 1995

[54] METHOD AND APPARATUS FOR CONFIGURING A SELECTED ADAPTER UNIT ON A COMMON BUS IN THE PRESENCE OF OTHER ADAPTER UNITS

[75] Inventors: Richard S. Reid, Mountain View; Niles Strohl, Tracy; Glenn W. Connery, Sunnyvale; Paul W. Sherer, Sunnyvale; James P. Rivers, Sunnyvale, all of Calif.

[73] Assignee: 3 COM Corporation, Santa Clara, Calif.

[21] Appl. No.: 93,380

[22] Filed: Jul. 19, 1993

[51] Int. Cl.⁶ .................................... G06F 13/00
[52] U.S. Cl. .................... 395/325; 395/275; 364/242.8; 364/DIG. 1
[58] Field of Search ............ 395/275, 325; 364/200, 364/900

[56] References Cited

U.S. PATENT DOCUMENTS

| | | | |
|---|---|---|---|
| 4,387,425 | 6/1983 | El-Gohary | 364/200 |
| 4,727,475 | 2/1988 | Kiremidjian | 340/825.07 |
| 4,766,536 | 8/1988 | Wilson, Jr. et al. | 364/200 |
| 4,773,005 | 9/1988 | Sullivan | 395/275 |
| 4,775,931 | 10/1988 | Dickie et al. | 395/275 |
| 4,980,850 | 12/1990 | Morgan | 364/900 |
| 5,111,423 | 5/1992 | Kopec, Jr. et al. | 395/500 |
| 5,117,494 | 5/1992 | Costes et al. | 395/575 |
| 5,175,822 | 12/1992 | Dixon et al. | 395/275 |
| 5,197,065 | 3/1993 | Calvignac et al. | 370/79 |
| 5,204,951 | 4/1993 | Keener et al. | 395/325 |
| 5,237,690 | 8/1993 | Bealkowski et al. | 395/700 |
| 5,276,814 | 1/1994 | Bourke et al. | 395/275 |
| 5,319,755 | 6/1994 | Farnwald et al. | 395/325 |
| 5,343,478 | 8/1994 | James et al. | 371/22.3 |

*Primary Examiner*—Christopher B. Shin
*Attorney, Agent, or Firm*—Townsend and Townsend Khourie and Crew; Kenneth R. Allen

[57] ABSTRACT

In a computer system having a central processing unit which employs software drivers as part of a host for controlling peripheral units and including a bus for connecting with adapters for the peripheral units, wherein each adapter has distributed intelligence means for interpreting simple command information and a nonvolatile storage element for storing default configuration information, including a default port address for communication, a method is provided for configuring such intelligent adapters connected to the bus. The method includes initializing the intelligent adapters by applying power to the bus or by issuing a global reset signal and causing a driver to be loaded by the central processing unit so that the host broadcasts a start key via a sequence of write commands via the bus to any adapters on the bus and to elicit responses from the intelligent adapters in an interactive manner to narrow communication between the intelligent adapters and the host to a single intelligent adapter without first specifying a unique port address. The narrowing process involves causing the intelligent adapters to first rank themselves for communication with the host by referring to unique ordered value information, e.g., an identification serial number, stored in the nonvolatile storage element, such as an EEPROM element, placed on the adapter.

4 Claims, 2 Drawing Sheets

METHOD AND APPARATUS FOR CONFIGURING A SELECTED ADAPTER UNIT ON A COMMON BUS IN THE PRESENCE OF OTHER ADAPTER UNITS

BACKGROUND OF THE INVENTION

This invention relates to the field of adapter connectivity and configuration setup techniques in computers which accept plug-in adapters, and more particularly to a computer with a true parallel connection bus where the positioning of an adapter device at a connector on the bus is independent of intended operation.

A peripheral or interface apparatus for a computer system, commonly known as an adapter, performs tasks between a central processing unit (CPU) with its related circuitry (.e.g., random access memory) and peripheral devices, such as a video display, a printer, a mass storage device, a telecommunications device or a network. These tasks include of reception, buffering processing and transmission of data. Each adapter must be configured to operate properly within its environment.

In the past, adapters have been rendered distinguishable by the placement position on a quasi-parallel bus structure (a bus which has position-sensitive or numbered connectors), such as found in the Extended ISA (EISA) environment or the MicroChannel environment, and/or by use of manual switches whereby the access or base address of the adapter in the memory space or Input/Output space of the processor is physically preset manually. In a true bus environment, such as is the case for the ISA bus, selective adapter placement is not possible and the manual setting of switches is not convenient or practical in some instances.

It is desirable to eliminate physical switches altogether and to enable "soft" configuration of an adapter. What would be highly useful is a mechanism whereby any adapter type equipped with appropriate automating elements can be electronically configured and automatically identified so that physical switch setting can be eliminated and/or so the adapter can be rendered insensitive to slot positioning.

SUMMARY OF THE INVENTION

According to the invention, in a computer system having a central processing unit which employs software drivers as part of a host for controlling peripheral units and including a parallel signal bus for connecting with adapters for the peripheral units, wherein each adapter has distributed intelligence means for interpreting simple command information and a nonvolatile storage element for storing default configuration information, including a default port address for communication, a method is provided for configuring such intelligent adapters connected to the bus. The method includes initializing the intelligent adapters by applying power to the bus or by issuing a global reset signal and causing a driver to be loaded by the central processing unit so that the host broadcasts an initiation key which consists of a sequence of write commands via the bus to any adapters on the bus to elicit responses from the intelligent adapters in an interactive manner to narrow communication between the intelligent adapters and the host to a single intelligent adapter without first specifying a unique port address. The narrowing process involves prompting the intelligent adapters to first rank themselves for communication with the host by referring to unique ordered value information, e.g., an identification serial number, stored in the nonvolatile storage element, such as an EEPROM element, placed on the adapter, and then having identified itself in the hierarchy, defer attempts at communication to other adapters having a higher rank. The adapter having the highest rank is then free to interactively communicate over the bus and to accept and report information without interference from other adapters.

Specifically, each intelligent adapter does not automatically invoke the default configuration upon initialization other than the default port address, but rather starts with an arbitration procedure. Each driver, which is loaded by the host and is to be used for enabling communication between the central processing unit and the adapter, causes a broadcast on the bus of an identification request sequence (Write ID Sequence) to prompt all initialized intelligent adapters into a command state and to return contents of a specific word address in the nonvolatile storage element. Thereafter, the host and all of the intelligent adapters interact using a primitive distributed intelligence means, i.e., a state machine, in a Read and Contend protocol which references the adapter's identification serial number value, each of which is unique to each adapter, to cause each adapter in turn to decide for itself whether it is the highest serial numbered adapter. Once an adapter has been noted as being the highest ranking active adapter, the host tags the ranking adapter with a tag and dismisses the ranking adapter, the tag assigning the adapter a unique identity. Adapters which have been tagged do not participate in the subsequent contention schemes which rank the remaining adapters. The host can select the tagged adapters by tags. The host can then command the selected adapter to activate some or all of the default configuration based on information stored in the nonvolatile storage unit. The command can also cause the host and the tagged adapter to lock onto a port address other than the default port address.

In subsequent interaction with the remaining adapters, substantially identical drivers are installed, and a similar protocol is followed until all of the adapters have been configured and enabled with unique port addresses. The tags may be used by the adapters themselves to streamline the read and contend protocol.

The invention eliminates jumpers and switches, relying merely on an EEPROM element, which is a nonvolatile programmable element, for all configuration information. Use of multiple, initially identical adapters are allowed in a true bus environment without danger of port contention.

A key feature of the setup procedure is control and attention to contention. The adapter is not rendered visible to other adapters on the bus until after automatic configuration logic has completed its reading of the EEPROM element and its loading of the configuration registers. A further understanding of the nature and advantage of this invention may be realized by reference to the remaining portions of the specification and drawings.

DESCRIPTION OF SPECIFIC EMBODIMENTS

Figure 1:
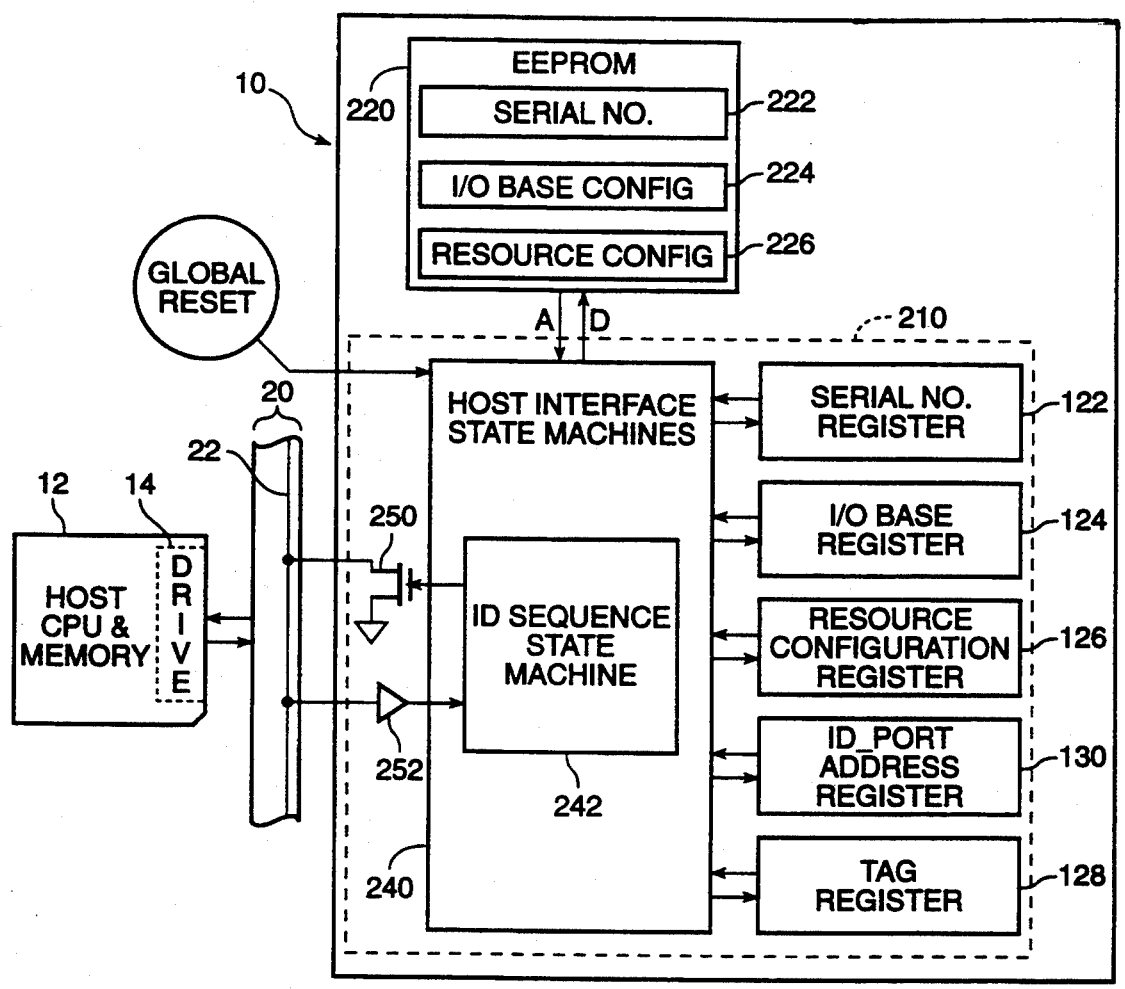
FIG. 1 is a block diagram of pertinent portions of a host computer, host bus and an adapter unit according to the present invention.

Referring to FIG. 1, a block diagram is shown of a portion of an interconnection of an exemplary adapter 10 which could be used according to the present invention with a client host central processing unit 12 connected via a true parallel bus, herein a host bus 20, such as an ISA bus, and intended to communicate with the adapter 10 through a software driver 14. The adapter 10 illustrated is merely an example showing part of the functional units and is not intended to be limiting as to the type of adapter which could be used in accordance with the invention.

Adapter 10 comprises a number of elements coupled to the host bus 20. The adapter 10 components enclosed by a dotted line indicate that this circuitry may all be contained within a single Application Specific Integrated Circuit (ASIC) 210. Adapter 10 may also employ an EEPROM 220, a nonvolatile digital storage device, coupled to the ASIC 210 to provide, in response to commands, certain data, such as i) an adapter identification term, which is unique for each adapter 10, which is also called a serial number stored in a specific memory location (Serial No. 222), ii) a default adapter I/O base address, stored in a location called the I/O base configuration 224, and additional default adapter configuration descriptions, stored in locations such as herein called resource configuration 226. Also contained within and employed throughout the ASIC 210 are other circuit components which may be specific to a particular adapter function but which are not pertinent to the present invention.

The ASIC 210 includes host interface state machines 240, namely, simple logic elements to respond to commands received through the host bus. Among the state machines 240 is an ID sequence state machine 242, which is coupled to a selected bit line 22 of the host bus 20 through a wired-OR-type driver circuit 250 for driving the selected bit line 22 and through a conventional receiver circuit 252 for reading signals on that selected bit line 22. (The key element is an open collector driver, an open drain driver or any circuit whose signal can be read and compared with local source data and which is subject to override by action by other drivers applying logic signals to a common node.)

Also in the ASIC 210 are volatile storage registers, including an I/O base register 124 for receiving and storing the I/O base 224 from the EEPROM 220, other resource configuration registers 126 for receiving and storing the resource configurations 226 from the EEPROM 220 and a serial number register 122 for receiving and storing the serial number 222 for the adapter 10. These registers are accessible within the ASIC 210 during applied power periods. In the absence of applied power, the registers store nothing, since the EEPROM 220 stores all such information without power, as it is nonvolatile.

The ASIC 210 also contains a tag register 128, as hereinafter explained, and it may also include an ID-port address register 130 (which could be a hardwired element specifying a common default port address used for the ID sequence state machine for contention).

Figure 2:
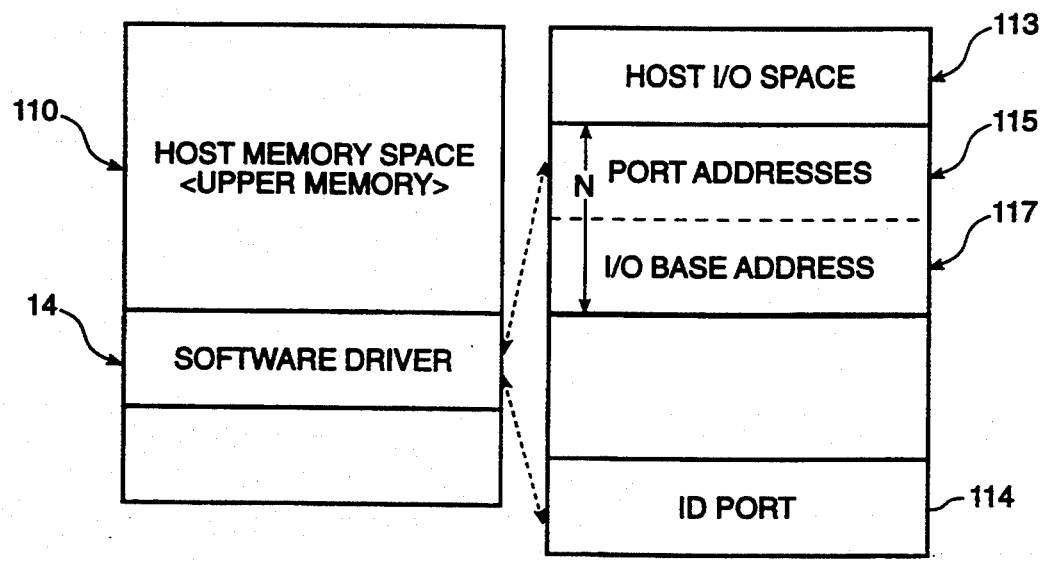
FIG. 2 is a block diagram of a portion of a memory space of a host computer.

The problem of having multiple adapters initially addressable at the same default port location of host computer I/O space is illustrated in FIG. 2. The host computer memory space 110 has in it an area set aside for a software driver 14. More importantly host I/O space 113 has a default base address 117 associated therewith. The I/O base address 117 is accessible to any adapter monitoring the port addresses 115 through the host bus 20 (FIG. 1). Thus, any instruction directed by the host 12 to the I/O base address 117 through the software driver 14 will elicit a response from all units, devices or adapters monitoring or sharing that address, thereby causing intolerable communication interference on the host bus 20.

According to the invention, after power up or a global reset or a specific command, the adapter 10 is not visible to the host 12 until after the automatic configuration logic in the form of the host interface state machine 240 has completed an identification sequence and after the adapter address has been set.

Figure 3:
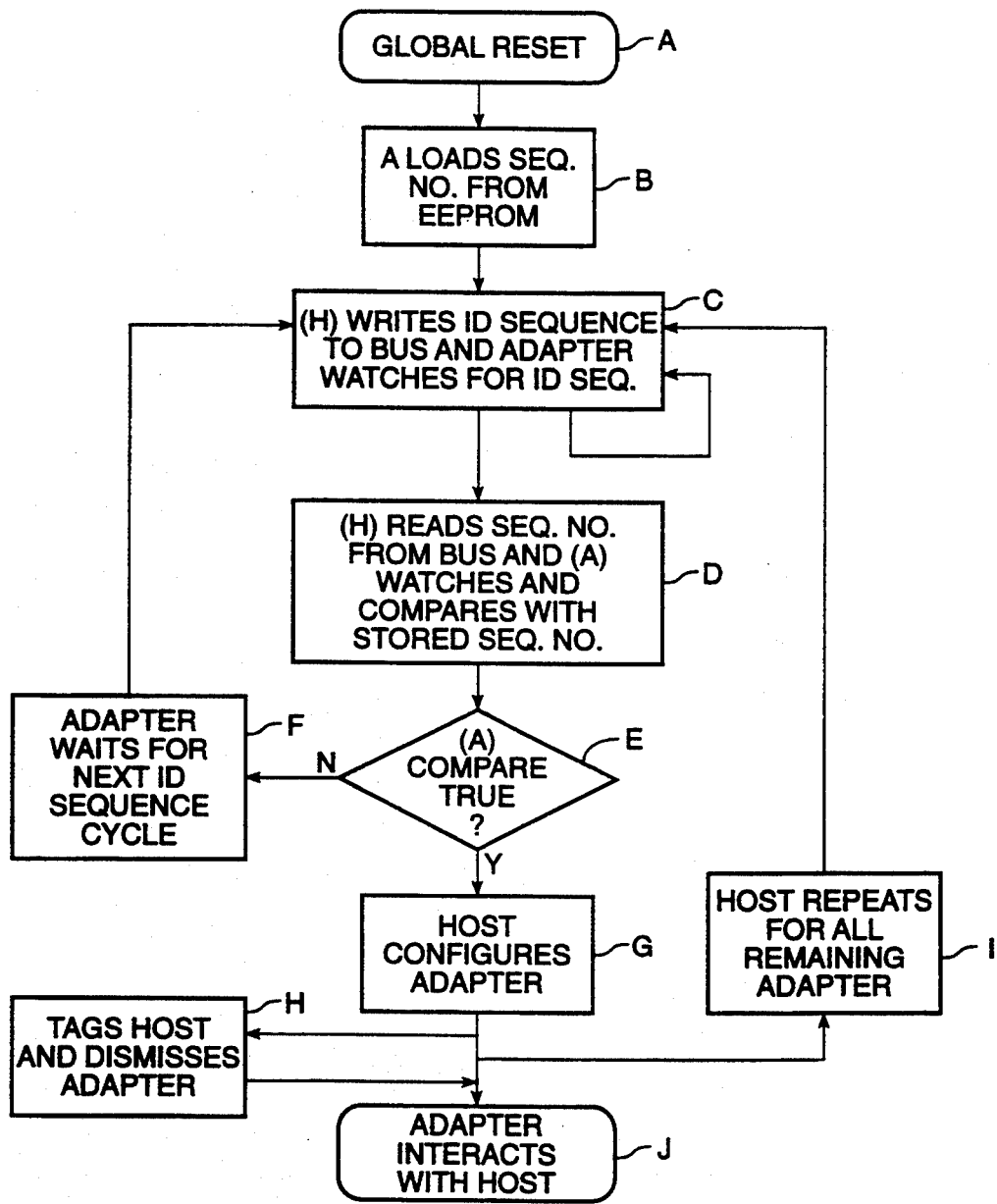
FIG. 3 is a process diagram of the automatic configuration sequence according to the invention.

FIG. 3 is a flow chart of a method according to the invention. An adapter 10 powers up or a global reset is invoked. At the outset, the adapter 10 is prevented from using the default resources and is isolated from the host bus 20 (Step A). The adapter 10, not yet under control of the software driver 14, thereupon retrieves the contents of the EEPROM 220 for the serial number (location 222) and stores the serial number in the serial number register 122 of the host (Step B). (At this point, the contents of EEPROM may also be loaded to the I/O base address register 124 and other resource configuration registers 126.) Since the contents of each EEPROM are being transferred to a physical location on each associated adapter and not to the bus 20, and since there is no information returned to the host 10, there is at this point no concern about interference among adapters. In connection with this initialization, all adapters 10 monitor all of the I/O address space 113 or a selected subset. When the ID sequence as hereinafter explained is written to a particular I/O address, that address is stored by the adapter 10 in the ID port address register 130 as the ID port 114, and then the ID sequence state machine 242 enters the command state. Specifically, the host writes a complete ID sequence, one byte at a time to the address which is to become the ID port 114 while the adapter 10 watches for the exact ID sequence of bytes in the I/O address space (Step C).

Thereafter, the host 12 initiates a contention protocol by reading from the ID port 114 on the host bus 20 (Step D). The contention protocol is a "mask for ID" sequence wherein one bit at a time is read by the host 12, read and compared by the adapter 10 with its own serial number, namely the value in the serial number register 122. The host 12 issues a read command to the host bus 20, each read returning one bit of a serial number from the serial number register 122. Each time a read is done, the adapter 10 reads bit line 22 through the wired-OR logic element 250 and compares the bit with its own corresponding bit from the serial number register 122 through receiver 257. Contention logic is invoked to determine if it is the lowest serial number. The ID sequence state machine 242 returns the serial number one bit at a time. If it has issued a zero (0 or voltage low on an open collector driver, which is considered by this convention to be of highest ranking) through the driver 250, it expects to see a zero (0) at the receiver 252. The ID sequence state machine 242 compares the corresponding bit in the serial number register 122 with the data from receiver 252 to determine if there is a match. If there is a match, the process continues with issuance of the next bit.

If there are multiple adapters in the system and one of them drives out a one (1) while the adapter of interest drives out a zero (0) on the bit line 22 of the host data bus 20, then, due to the wired-OR logic, both adapters will read a zero (0) on the bit line 22. The contention test continues with each bit. If the data does not compare (Step E) with the data driven out, then the ID sequence state machine 242 has a contention failure (Step F). This is a signal to cause the adapter 10 to go into an inactive state (Step F). It will wait for a next ID sequence.

Specifically, the adapter 10 tests itself to determine if it is the highest ranking adapter (lowest serial number 0 not 1) still on the bus and if so, the host 12 configures the adapter 10 (Step G), tags the adapter 10 for future reference with a value placed in the tag register 128, and dismisses the adapter 10 (Step H). The content of the tag register 128 can be read by the software driver 14 and used to identify the adapter 10 and possibly select the adapter 10 for later access. The writing of the ID sequence continues (Step I) for the remaining adapters which had contention failure.

Since serial numbers are by definition unique, only the single adapter with the highest ranking serial number (closest to zero) will be active at the end of the contention sequence. This adapter 10 can then communicate uniquely, i.e., without interference from the other adapters, with the software driver 14 of the host 12 (Step J).

Multiple software drivers and multiple adapters can be loaded and set up in a similar automatic manner. Once the first software driver 14 has been loaded and has established communication uniquely with an adapter, additional drivers can be activated and the content of the Tag register can be used to uniquely identify each adapter on the bus without repeating the entire ID sequence.

The invention has now been explained with reference to specific embodiments. Other embodiments will be apparent to those of ordinary skill in the art. It is therefore not intended that this invention be limited, except as indicated by the appended claims.

What is claimed is:

1. A method for configuring a selected adapter unit on a host bus of a host computer in the presence of at least one other adapter unit also coupled to said host bus to interact with said host computer in a common address space, said configuring method for assigning to said selected adapter unit a unique address in said address space, said selected adapter unit and each said other adapter unit having an initially unknown port address in address space of the host computer, said selected adapter unit and said at least one other adapter unit being initially indistinguishable to said host computer, the method comprising the steps of:

providing in said selected adapter unit and each said at least one other adapter unit nonvolatile storage means with a record of an adapter serial number having an inherent value, said adapter serial number being globally unique for said selected adapter unit and each said at least one other adapter unit, a default adapter I/O base address, and a default adapter configuration description;

providing volatile register means in said selected adapter unit and each said at least one other adapter unit for active storage of said adapter serial number, a current adapter I/O base address and a current adapter configuration description;

providing an identification sequence state machine means in said selected adapter unit and each said at least one adapter unit for controlling access via the host bus to said selected adapter unit and said at least one other adapter unit;

providing in said selected adapter unit and in said at least one other adapter unit at a selected bit position of the host bus an open-drain-type driver circuit for use in a wired-OR logic function when coupled to the host bus;

providing driver logic means at the host computer for broadcasting commands and for reading and writing information on the host bus; thereafter initializing said selected adapter unit and said at least one other adapter unit to prevent said selected adapter unit and said at least one other adapter unit from responding to accesses to resources from the host computer via the host bus other than a default I/O port, and to initially load said volatile register means with at least said adapter serial number; thereafter broadcasting by means of the driver logic means a command via the host bus to cause said selected adapter unit and said at least one other adapter unit to respond to a contention protocol; thereafter causing said selected adapter unit and said at least one other adapter unit to contend for right to access to the host bus, by:

i) writing in response to a host-issued read access command by means of said identification sequence state machine a write bit value of said adapter serial number according to bit position sequence to said selected bit position to said volatile register means through said open drain-type-driver circuit; thereupon at the end of the writing step ii) reading by means of said identification sequence state machine from said volatile register means said selected bit position for a read bit value; thereafter iii) comparing the write bit value and the read bit value for a match; and iv) if there is a match, repeating with steps i), ii) and iii) for a next bit value, until a complete sequence representing all bits of a serial number has been read; and v) if there is not a match, noting a contention failure in said at least one other adapter unit and terminating the contending steps for said at least one other adapter unit;

to cause said selected adapter unit, which has highest adapter sequence based on said inherent value of said serial number relative to at least one other adapter unit, is alone active at the default port address on the host bus; and enabling by means of the identification sequence state machine the selected adapter unit to communicate with the host computer via the driver means upon reference to said selected address.

2. The method according to claim 1 wherein said selected adapter unit is isolated and provided with a tag for reference against participation, including said selected adapter unit, in further contention.

3. The method according to claim 1 wherein said enabling step includes:

accepting instructions from the host computer to establish an adapter configuration description to other than the default adapter configuration description.

4. An apparatus for use in a host computer having a host bus, for use in a selected adapter unit coupled to said host bus and for use in at least one other adapter unit also coupled to said host bus, said selected adapter unit and said at least one other adapter unit being initially indistinguishable to said host computer, to configure the selected adapter unit in the presence of said at least one other adapter unit also coupled to said host bus to interact with said host computer in a common address space, said apparatus comprising:

- a nonvolatile storage means in the selected adapter unit with records of an adapter serial number, a default adapter base address, and a default adapter configuration description for the adapter unit;
- a volatile register means in the selected adapter unit for active storage of said adapter serial number, current adapter base address and a current adapter configuration description;
- an identification sequence state machine means in said selected adapter unit for controlling access via the host bus to said volatile register means;
- a wired-OR-type driver circuit in said selected adapter unit at a selected bit position of the host bus for use in a wired-OR logic function;
- driver logic means at the host computer for broadcasting commands and for reading and writing information on the host bus;
- said identification sequence state machine including contention logic for allowing said selected adapter unit to select for itself a value for use as said current base address in address space of the host computer, said contention logic including:
  - i) means coupled to said wired-OR-driver circuit for writing a write bit value of said adapter serial number according to bit position sequence to said selected bit position to said volatile register means; thereupon at the end of the writing
  - ii) means for reading said selected bit position from said volatile register means for a read bit value; thereafter
  - iii) means for comparing the write bit value and the read bit value for match; and
  - iv) means, if there is a match, for repeatedly writing, reading and comparing until a complete sequence representing all bits of a serial number has been read; and
  - v) if there is not a match, means for noting a contention failure in the at least one other adapter unit and terminating the contention;

to cause said selected adapter unit, if it has a highest adapter sequence, as sensed from value information inherent in said serial number, relative to said at least one other adapter unit, to be set uniquely at a selected address in said address space of the host bus; and means coupled to said host bus for enabling the selected adapter unit to communicate with the host computer via the driver means upon reference to said selected address.

* * * * *